United States Patent
Zeng et al.

(10) Patent No.: US 12,146,042 B2
(45) Date of Patent: Nov. 19, 2024

(54) METHOD FOR PREPARING DUAL-SENSITIVE CELLULOSE-BASED AEROGEL

(71) Applicant: Xiamen University, Fujian (CN)

(72) Inventors: Xianhai Zeng, Fujian (CN); Guihua Yan, Fujian (CN); Yong Sun, Fujian (CN); Xing Tang, Fujian (CN); Lu Lin, Fujian (CN); Tingzhou Lei, Fujian (CN)

(73) Assignee: Xiamen University, Fujian (CN)

( * ) Notice: Subject to any disclaimer, the term of this patent is extended or adjusted under 35 U.S.C. 154(b) by 897 days.

(21) Appl. No.: 17/147,419

(22) Filed: Jan. 12, 2021

(65) Prior Publication Data

US 2021/0130567 A1    May 6, 2021

Related U.S. Application Data

(63) Continuation of application No. PCT/CN2019/095649, filed on Jul. 11, 2019.

(30) Foreign Application Priority Data

Jul. 12, 2018 (CN) .......................... 201810764978.3

(51) Int. Cl.
*C08J 9/28* (2006.01)
*C08F 251/02* (2006.01)

(52) U.S. Cl.
CPC .............. *C08J 9/28* (2013.01); *C08F 251/02* (2013.01); *C08J 2201/0484* (2013.01); *C08J 2205/026* (2013.01); *C08J 2301/02* (2013.01); *C08J 2333/14* (2013.01)

(58) Field of Classification Search
CPC .................... C08J 9/28; C08J 2301/00–32
See application file for complete search history.

(56) References Cited

FOREIGN PATENT DOCUMENTS

| CN | 105622869 A | 6/2016 |
|---|---|---|
| CN | 106632925 A | 5/2017 |
| CN | 106821963 A | 6/2017 |
| CN | 107474263 A | 12/2017 |
| CN | 109134914 A | 1/2019 |

OTHER PUBLICATIONS

Zhao, Linyan et al., "Preparation and Characterization of Thermo- and pH Dual-Responsive 3D Cellulose-Based Aerogel for Oil/Water Separation", Applied Physics a Materials Science & Processing , vol. 124, Issue 1, Nov. 30, 2017 Day (Nov. 30, 2017), Section 2.2-2.4.

Zhao, Jiangqi et al., "Polyethylenimine-Grafted Cellulose Nanofibril Aerogels as Versatile Vehicles for Drug Delivery". Applied Materials & Interfaces , vol. 7, Issue 4, Jan. 6, 2015 (Jan. 6, 2015), p. 2607-2615.

International Search Report and English Translation of International Search Report as cited in PCT Application No. PCT/CN2019/095649, dated Sep. 27, 2019, 7 pages.

Written Opinion and English Translation of Written Opinion as cited in PCT Application No. PCT/CN2019/095649, dated Sep. 27, 2019, 10 pages.

*Primary Examiner* — Stephen E Rieth
(74) *Attorney, Agent, or Firm* — Cooper Legal Group, LLC

(57) ABSTRACT

The present disclosure discloses a method for preparing dual-sensitive cellulose-based aerogel. The DAC (Dialdehyde cellulose), the DAC/PDMAEMA (poly-2-(dimethylamino)ethyl methacrylate) copolymer, the DAC/PDMAEMA/PEI (Polyethylenimine) copolymer are serially prepared, was freeze-dried to obtain a product. The product is the dual-sensitive cellulose-based aerogel, a cumulative adsorption capacity of the dual-sensitive cellulose-based aerogel is 250 mg/g, and a cumulative release amount of the dual-sensitive cellulose-based aerogel in 0.05 mol/L $NaH_2PO_4$ (pH=3-8), 0.2% NaCl (pH<3), or NaOH (pH>8) is 63-90%.

7 Claims, No Drawings

METHOD FOR PREPARING DUAL-SENSITIVE CELLULOSE-BASED AEROGEL

RELATED APPLICATIONS

This application is a continuation of International Patent Application PCT/CN2019/095649, filed on Jul. 11, 2019, which claims priority to Chinese patent application number 201810764978.3, filed on Jul. 12, 2018. International Patent Application PCT/CN2019/095649 and Chinese patent application number 2018210764978.3 are incorporated herein by reference.

FIELD OF THE DISCLOSURE

The present disclosure relates to a method for modifying natural polymer materials, and in particular relates to a method for preparing dual-sensitive cellulose-based aerogel.

BACKGROUND OF THE DISCLOSURE

Traditional pharmaceutical preparations usually have many side effects, such as gastrointestinal or renal side effects. Moreover, most drugs have a short half-life and must be taken in multiple doses daily to maintain therapeutic blood levels. Therefore, focusing on drug release, drug action intensity, and drug effect duration has become the subject of research in related disciplines.

At present, some polymers have been developed to achieve sustained drug release to increase the drug effect duration. However, most pharmaceutical preparations such as polyethylene (PE), polypropylene (PP), and Polydimethylsiloxane (PDMS) are chemically synthesized and non-biodegradable. At present, natural polysaccharides or their derivatives have become the first choice for drug-delivery research due to their biodegradability, reproducibility, and low toxicity. In particular, the unique properties of cellulose shown in many natural polysaccharides, such as large specific surface area, high strength, high stiffness, and easy chemical modification, have attracted widespread attention in various research fields.

Commonly used drug delivery systems comprise ion exchange resins, membranes, microspheres, gels, and the like. As a special high-porosity material, aerogel has aroused widespread interest in biomedicine and medical applications. However, virgin cellulose has very low drug loading capacity. Therefore, the chemical modification of cellulose has become an important step to improve the practicality of cellulose. Polyethylenimine (PEI) contains a large number of primary and secondary amine groups on the molecule, showing excellent drug delivery performance Poly-2-(dimethylamino)ethyl methacrylate (PDMAEMA) comprises groups that are sensitive to $H^+$ and $OH^-$, and are sensitive to change according to external pH and temperature. PPDMAEMA can be used as a delivery carrier of smart materials to enable drugs to be targeted directly to the lesion site, thereby improving the efficacy of drugs, which is a trend in the development of drug delivery systems.

BRIEF SUMMARY OF THE DISCLOSURE

In order to overcome deficiencies of the existing techniques, the present disclosure provides a method for preparing dual-sensitive cellulose-based aerogel to solve the problems of the background.

A technical solution of the present disclosure is as follows.

A method for preparing dual-sensitive cellulose-based aerogel comprises the following steps.

(1) mixing cellulose and an $IO_4^-$ donor at a molar ratio of 1:0.2-2.0%, stirring in dark for 0.5-48 hours at 25-75° C., washing with deionized water, and dialyzing to obtain DAC (Dialdehyde cellulose) with a molecular weight of 5000-20000.

(2) adding the DAC and DMAEMA (2-(dimethylamino) ethyl methacrylate) into deionized water, stirring evenly to obtain a mixed solution in a $N_2$ atmosphere, adjusting pH of the mixed solution to ≤3, adding CAN (cerium ammonium nitrate) into the mixed solution, stirring for at least 5 hours in the $N_2$ atmosphere, and dialyzing to obtain a DAC/PDMAEMA (poly-2-(dimethylamino)ethyl methacrylate) copolymer with a molecular weight of 5000-20000, wherein a mass ratio of the DAC, the DMAEMA, and the CAN is DAC:DMAEMA:CAN=1.0 g:5.0-50.0 mg:0.5-5.0 mg.

(3) mixing the DAC/PDMAEMA copolymer and PEI (Polyethylenimine) with a molecular weight of less than 10,000 at a mass ratio of 1:0.5-5.0, stirring at room temperature for graft copolymerization, and then dialyzing to obtain a suspension of a DAC/PDMAEMA/PEI copolymer with a molecular weight of 5000-20000.

(4) rapidly freezing the suspension of the DAC/PDMAEMA/PEI copolymer and then freeze-drying to obtain a product, wherein the product is a pH/temperature dual-sensitive cellulose-based aerogel, a cumulative adsorption capacity of the dual-sensitive cellulose-based aerogel is 250 mg/g, and a cumulative release amount of the dual-sensitive cellulose-based aerogel in 0.05 mol/L $NaH_2PO_4$ (pH=3-8), 0.2% NaCl (pH<3), or NaOH (pH>8) is 63-90%.

In a preferred embodiment, the step (1) comprises preparing a DAC aqueous solution of the DAC. The preparing a DAC aqueous dispersion of the DAC comprises the following steps. Adding the DAC to deionized water, reacting at 70-150° C. for 0.5 hours to 4 hours at a stirring speed of 200-1000 rpm, centrifuging, and concentrating to obtain a transparent DAC aqueous solution.

In a preferred embodiment, the cellulose comprises natural biomass cellulose or cellulose chemicals, the natural biomass cellulose comprises cellulose extracted from bamboo, wood, or cotton, and the cellulose chemicals comprise microcrystalline cellulose or nanocellulose.

In a preferred embodiment, the $IO_4^-$ donor comprises periodic acid, sodium periodate, or potassium periodate.

In a preferred embodiment, the step (3) comprises adding a reducing agent, and the reducing agent comprises at least one of lithium aluminum hydride, borohydride potassium, sodium borohydride, or sodium cyanoborohydride.

In a preferred embodiment, the step (4) comprises stirring the product in a NaSA (Sodium Salicylate) solution for 22-26 hours to measure the adsorption capacity and comprises adding the product into a $NaH_2PO_4$ solution of 0.05 mol/L and pH=7.4 or a NaCl solution with a mass concentration of 0.2% and pH=2 to measure a maximum release amount of the cumulative release amount.

Compared with the existing techniques, the technical solution has the following advantages.

1. An operation of the preparation method of the present disclosure is simple, raw materials have a low cost, sources are wide, and the raw materials are environmentally friendly. The preparation method of the present disclosure has a low cost, a good biocompatibility, and meets requirements of a sustainable development.

2. The cellulose aerogel prepared by the present disclosure has a low density, a light weight, low toxicity, low side effects, good pH sensitivity, good temperature sensitivity, can specifically deliver drugs into the stomach or intestine to improve drug efficiency and targeting, is suitable for drug sustained release, medical dressings, etc., and has broad application prospects in biomedical materials.

DETAILED DESCRIPTION OF THE EMBODIMENTS

Embodiment 1

A method for preparing dual-sensitive cellulose-based aerogel of this embodiment uses biomass cellulose as a raw material, and the method comprises the following steps.

(0) Pre-treatment, cellulose suspension preparation: 200 g of paper pulp (or bamboo pulp) was soaked in water for 1-2 hours and was mechanically stirred for 2-5 hours with a rotating speed of less than 100 rpm. The paper pulp was fibrillated to obtain a dispersion liquid by cyclic feeding in an ultra-micro grinding machine with a rotation speed of 1000-2000 rpm, and a grinding disc gap gradually decreasing from 2 mm to 0 μm or even lower. The dispersion liquid was finally homogenized 10-30 times by high-pressure homogenization and was then subjected to a preset degree of rotary evaporation and concentration to obtain a stable cellulose suspension (a concentration of the paper pulp was 0.55 wt % and a concentration of the bamboo pulp was 0.48 wt %).

(1) DAC (Dialdehyde cellulose) preparation: 100 mL of 0.55 wt % of the cellulose suspension of the paper pulp or 0.48 wt % of the cellulose suspensio of the bamboo pulp and 1.5 g NaIO$_4$ were added into a 250 mL Erlenmeyer flask, were stirred in the dark for 6 hours at room temperature (i.e., 20-25° C.), were then centrifuged, were washed with deionized water, and were dialyzed to obtain 0.42 g/g DAC aqueous dispersion.

(2)-(3) Copolymer Preparation: 1 g of the DAC aqueous dispersion and 50 mg of polymerizable monomer DMAEMA (2-(dimethylamino)ethyl methacrylate, the molecular formula is $C_8H_{15}NO_2$ and the molecular weight is 157.21) were added into a three-necked flask containing deionized water and were evenly stirred to obtain a mixed solution in a $N_2$ atmosphere, pH of the mixed solution was adjusted to 3 using 70% $HNO_3$, 5 mg of CAN (cerium ammonium nitrate) was added to the mixed solution, was continually stirred for 6 hours, and was dialyzed to obtain a DAC/PDMAEMA (poly-2-(dimethylamino)ethyl methacrylate) copolymer. 1 g of the DAC/PDMAEMA copolymer and 2.5 g PEI (Polyethylenimine, molecular weight is 600) was fully mixed to obtain a suspension, the suspension was stirred at room temperature for 12 hours and was then dialyzed, and a concentration of the suspension was adjusted to about 0.1% to obtain a DAC/PDMAEMA/PEI copolymer uniform dispersion liquid.

PDMAEMA is a temperature and pH sensitive polymer. A molecular structure of PDMAEMA comprises hydrophilic tertiary amino groups, hydrophilic carbonyl groups, and hydrophobic alkyl groups concurrently. Two types of groups match each other in space structure.

(4) Aerogel preparation: 10 mL of the DAC/PDMAEMA/PEI copolymer uniform dispersion liquid was rapidly frozen in liquid nitrogen at −196° C. and was then put into a freeze-drying chamber for 12 hours to obtain a product.

0.1 g of the product was added into a 0.2 M (i.e., Mol/L) Sodium Salicylate (NaSA) solution and was stirred for 24 hours. An adsorption capacity of the product after the NaSA solution was added was 95 mg/g and a maximum release amount was nearly 60% in a 0.2% NaCl solution (pH=2).

Embodiment 2

Embodiment 2 differs from Embodiment 1 in the following ways.

(1) 2 g of the DAC aqueous dispersion in step (1) of Embodiment 1 was added in a round-bottomed flask containing 100 mL deionized water, was stirred for 2 hours at 100° C., and was centrifuged to obtain a DAC aqueous solution with a concentration of 3.2 mg/mL.

(2)-(3) 50 mL of the DAC aqueous solution and 20 mg of polymerizable monomer DMAEMA were added into a three-necked flask containing deionized water and were evenly stirred to obtain a mixed solution in a $N_2$ atmosphere, pH of the mixed solution was adjusted to <3 using 70% $HNO_3$, 5 mg of CAN was added into the mixed solution, was continually stirred for 6 hours, and was dialyzed to obtain a DAC/PDMAEMA copolymer. 0.1 g of the DAC/PDMAEMA copolymer and 0.5 g PEI (molecular weight is 600) were fully mixed to obtain a suspension, the suspension was stirred at room temperature for 12 hours and was then dialyzed, and a concentration of the suspension was adjusted to about 0.1% to obtain a DAC/PDMAEMA/PEI copolymer uniform dispersion liquid.

(4) 10 mL of the DAC/PDMAEMA/PEI copolymer uniform dispersion liquid was rapidly frozen in liquid nitrogen at −196° C. and was then put into a freeze-drying chamber for 12 hours to obtain a product.

0.1 g of the product was added into a 0.1 M NaSA solution and was stirred for 24 hours. An adsorption capacity of the product after the NaSA solution was added was 80 mg/g and a maximum release amount was nearly 90% in a 0.05 mol/L NaH2PO4 solution (pH=7.4).

Embodiment 3

(1) 100 mL of 0.48 wt % the cellulose suspension of bamboo pulp and 1.75 g of NaIO$_4$ were added into a 250 mL Erlenmeyer flask, were stirred in the dark for 48 hours at room temperature, were then centrifuged, were washed with deionized water, and were dialyzed to obtain 0.35 g/g DAC aqueous dispersion.

(2)-(3): 1 g of the DAC aqueous dispersion and 50 mg of polymerizable monomer DMAEMA were added into a three-necked flask containing deionized water and were evenly stirred to obtain a mixed solution in a $N_2$ atmosphere, pH of the mixed solution was adjusted to 1 using 70% $HNO_3$, 3 mg of CAN was added into the mixed solution, was continually stirred for 12 hours, and was dialyzed to obtain a DAC/PDMAEMA copolymer. 1 g of the DAC/PDMAEMA copolymer and 5.0 g of PEI (molecular weight is 1800) were fully mixed to obtain a suspension, the suspension was stirred at room temperature for 12 hours and was then dialyzed, and a concentration of the suspension was adjusted to about 0.1% to obtain a DAC/PDMAEMA/PEI copolymer uniform dispersion liquid.

(4) 10 mL of the DAC/PDMAEMA/PEI copolymer uniform dispersion liquid was rapidly frozen in liquid nitrogen at −196° C. and was then put into a freeze-drying chamber for 12 hours to obtain a product.

0.1 g of the product was added into a 0.5 M NaSA solution and was stirred for 24 hours. An adsorption capacity of the product after the NaSA solution was added was 90 mg/g and a maximum release amount was nearly 63% in a 0.2% NaCl solution (pH=2).

Embodiment 4

(1) 2 g of the DAC aqueous dispersion in Embodiment 3 was added into a round bottom flask containing 100 mL deionized water, was stirred for 2 hours at 100° C., and was centrifuged to obtain a DAC aqueous solution with a concentration of 2.1 mg/mL.

(2)-(3) 50 mL of the DAC aqueous solution and 20 mg of polymerizable monomer DMAEMA were added into a three-necked flask containing deionized water and were evenly stirred to obtain a mixed solution in a $N_2$ atmosphere, pH of the mixed solution was adjusted to 2 using 70% $HNO_3$, 2 mg of CAN was added into the mixed solution and was continually stirred for 24 hours, and was then dialyzed to obtain a DAC/PDMAEMA copolymer. 0.1 g of the DAC/PDMAEMA copolymer and 0.5 g of PEI (molecular weight is 1800) were fully mixed to obtain a suspension, the suspension was stirred at room temperature for 12 hours and was then dialyzed, and a concentration the suspension was adjusted to about 0.1% to obtain a DAC/PDMAEMA/PEI copolymer uniform dispersion liquid.

(4) 10 mL of the DAC/PDMAEMA/PEI copolymer uniform dispersion liquid was rapidly frozen in liquid nitrogen at −196° C. and was then put into a freeze-drying chamber for 12 hours to obtain a product.

0.1 g of the product was added into a 2.0 M NaSA solution and was stirred for 24 hours. An adsorption capacity of the product after the NaSA solution was added was 64 mg/g and a maximum release amount was nearly 50% in a 0.2% NaCl solution (pH=2).

Embodiment 5

This embodiment uses microcrystalline cellulose, which is a cellulose chemical product commercially available, and step (0) of Embodiment 1 in which the biomass cellulose was used as a raw material to prepare a cellulose suspension was omitted. The method comprises the follow steps.

(1) 1 g of microcrystalline cellulose and 0.5 g of $NaIO_4$ were added into a 250 mL Erlenmeyer flask, were stirred in the dark for 6 hours at room temperature, were then centrifuged, were washed with deionized water, and were dialyzed to obtain 51 g/g DAC aqueous dispersion.

(2) 1 g of the DAC aqueous dispersion and 30 mg of polymerizable monomer DMAEMA were added into a three-necked flask containing deionized water and were evenly stirred to obtain a mixed solution in a $N_2$ atmosphere, pH of the mixed solution was adjusted to 2 using 70% $HNO_3$, 5 mg of CAN was added into the mixed solution, was continually stirred for 12 hours, and was dialyzed to obtain a DAC/PDMAEMA copolymer.

(3) 1 g of the DAC/PDMAEMA copolymer and 0.5 g of PEI (molecular weight is 600) were fully mixed to obtain a suspension, the suspension was stirred for 12 hours at room temperature and was then dialyzed, and a concentration of the suspension was adjusted to about 0.1% to obtain a DAC/PDMAEMA/PEI copolymer uniform dispersion liquid.

(4) 10 mL of the DAC/PDMAEMA/PEI copolymer uniform dispersion liquid was rapidly frozen in liquid nitrogen at −196° C. and was then put in a freeze-drying chamber for 12 hours to obtain a product.

0.1 g of the product was added into a 1.0 M NaSA solution and was stirred for 24 hours. An adsorption capacity of the product after the NaSA solution was added was 82 mg/g and a maximum release amount was nearly 87% in a NaOH solution (pH=10.0).

Embodiment 6

Embodiment 6 also uses cellulose chemical products commercially available, and step (0) of Embodiment 1 in which the biomass cellulose was used as a raw material to prepare a cellulose suspension was omitted.

(1) 1 g of nanocellulose and 2.0 g of $NaIO_4$ were added into a 250 mL Erlenmeyer flask, were stirred in the dark for 6 hours at room temperature, were then centrifuged, were washed with deionized water, and were dialyzed to obtain 0.44 g/g DAC aqueous dispersion.

(2) 1 g of the DAC aqueous dispersion and 5 mg of polymerizable monomer DMAEMA were added into a three-necked flask containing deionized water and were evenly stirred to obtain a mixed solution in $N_2$ atmosphere, pH of the mixed solution was adjusted to 2 using $HNO_3$, 5 mg of CAN was added into the mixed solution, was continually stirred for 6 hours, and was dialyzed to obtain a DAC/PDMAEMA copolymer.

(3) 1 g of the DAC/PDMAEMA copolymer and 5.0 g of PEI (molecular weight is 10000) were fully mixed to obtain a suspension, the suspension was stirred at room temperature for 12 hours and was then dialyzed, and a concentration of the suspension was adjusted to about 0.1%, to obtain a DAC/PDMAEMA/PEI copolymer uniform dispersion liquid.

(4) 10 mL of the DAC/PDMAEMA/PEI copolymer uniform dispersion liquid was rapidly frozen in liquid nitrogen at −196° C. and was then put in a freeze-drying chamber for 12 hours to obtain a product.

0.1 g of the product was added into a 0.01 M NaSA solution and was stirred for 24 hours. An adsorption ratio of the product after the NaSA solution was added was 56% and a maximum release amount was nearly 60% in a 0.05 mol/L $NaH_2PO_4$ (pH=5.7) solution.

Embodiment 7

(1) 1 g of nanocellulose and 1.0 g of $NaIO_4$ were added into a 250 mL Erlenmeyer flask, were stirred in the dark for 60 hours at room temperature, were then centrifuged, were washed with deionized water, and were dialyzed to obtain 0.37 g/g DAC aqueous dispersion.

(2) 1 g of the DAC aqueous dispersion and 50 mg of polymerizable monomer DMAEMA were added into a three-necked flask containing deionized water and were evenly stirred to obtain a mixed solution in a $N_2$ atmosphere, pH of the mixed solution was adjusted to 2 using $HNO_3$, and 5 mg of CAN was added into the mixed solution, was continually stirred for 12 hours, and was dialyzed to obtain a DAC/PDMAEMA copolymer.

(3) 1 g of the DAC/PDMAEMA copolymer and 2.5 g of PEI (molecular weight is 1800) were fully mixed to obtain a suspension, the suspension was stirred for 12 hours at room temperature and was then dialyzed, and a concentration of the suspension was adjusted to about 0.1% to obtain a DAC/PDMAEMA/PEI copolymer uniform dispersion liquid.

(4) 10 mL of the DAC/PDMAEMA/PEI copolymer uniform dispersion liquid was rapidly frozen in liquid nitrogen at −196° C., and was then put into a freeze-drying chamber for 12 hours to obtain a product.

0.1 g of the product was added into a 0.02 M NaSA solution and was stirred for 24 hours. An adsorption ratio of the product after the NaSA solution was added was 70%, and a maximum release amount was nearly 55% in a 0.2% NaCl (pH=2) solution.

Embodiment 8

(1) 1 g of nanocellulose and 1.0 g of $NaIO_4$ were added into a 250 mL Erlenmeyer flask, were stirred in the dark for 60 hours at room temperature, were then centrifuged, were washed with deionized water, and were dialyzed to obtain a 0.37 g/g DAC aqueous dispersion.

(2) 1 g of the DAC aqueous dispersion and 50 mg of the polymerizable monomer DMAEMA were added into a three-necked flask containing deionized water and were evenly stirred to obtain a mixed solution in $N_2$ atmosphere, pH of the mixed solution was adjusted to 2 using $HNO_3$, and 5 mg of CAN was added into the mixed solution, was continually stirred for 12 hours, and was dialyzed to obtain a DAC/PDMAEMA copolymer.

(3) 1 g of the DAC/PDMAEMA copolymer and 2.5 g PEI (molecular weight is 600) were fully mixed to obtain a suspension, 0.1 g of sodium borohydride was added into the suspension, and the suspension was stirred for 2 hours at room temperature and was then dialyzed, and a concentration of the suspension was adjusted to about 0.1% to obtain a DAC/PDMAEMA/PEI copolymer uniform dispersion liquid.

(4) 10 mL of the DAC/PDMAEMA/PEI copolymer uniform dispersion liquid was rapidly frozen in liquid nitrogen at −196° C. and was then put into a freeze-drying chamber for 12 hours to obtain a product.

0.1 g of the product was added into a 0.05M NaSA solution and was stirred for 24 hours. An adsorption capacity of the product after the NaSA solution was added was 91 mg/g and a maximum release amount was nearly 70% in a 0.05 mol/L $NaH_2PO_4$ solution (pH=7.4).

For those skilled in the art, when technical parameters of the present disclosure are changed within the following range, same or similar technical effects relative to the embodiments can be expected: a reducing agent was added in the step (3), and the reducing agent comprises at least one of lithium aluminum hydride, potassium borohydride, sodium borohydride, or sodium cyanoborohydride.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A method for preparing dual-sensitive cellulose-based aerogel, comprising:
   (1) mixing cellulose and $IO_4^-$ donors with a ratio of moles of repeat units of the cellulose to moles of the $IO_4^-$ donors being 1:0.2-2, stirring in dark for 0.5-48 hours at 25-75° C., washing with deionized water, and dialyzing to obtain DAC (Dialdehyde cellulose) with a molecular weight of 5000-20000;
   (2) adding the DAC and DMAEMA (2-(dimethylamino) ethyl methacrylate) into deionized water, stirring evenly to obtain a mixed solution in a $N_2$ atmosphere, adjusting pH of the mixed solution to ≤3, adding CAN (cerium ammonium nitrate) into the mixed solution, stirring for at least 5 hours in the $N_2$ atmosphere, and dialyzing to obtain a DAC/PDMAEMA (poly-2-(dimethylamino) ethyl methacrylate) copolymer with a molecular weight of 5000-20000, wherein a mass ratio of the DAC, the DMAEMA, and the CAN is DAC: DMAEMA:CAN=1000:5.0-50.0:0.5-5.0;
   (3) mixing the DAC/PDMAEMA copolymer and PEI (Polyethylenimine) with a molecular weight of less than 10,000 at a mass ratio of 1:0.5-5.0, stirring at room temperature for graft copolymerization, and then dialyzing to obtain a suspension of a DAC/PDMAEMA/PEI copolymer with a molecular weight of 5000-20000; and
   (4) freezing the suspension of the DAC/PDMAEMA/PEI copolymer and then freeze-drying to obtain a product.

2. A method for preparing dual-sensitive cellulose-based aerogel, comprising:
   (1) mixing cellulose and $IO_4^-$ donors with a ratio of moles of repeat units of the cellulose to moles of the $IO_4^-$ donors being 1:0.2-2, stirring in dark for 0.5-48 hours at 25-75° C., washing with deionized water, and dialyzing to obtain DAC (Dialdehyde cellulose) with a molecular weight of 5000-20000;
   (2) adding the DAC and DMAEMA (2-(dimethylamino) ethyl methacrylate) into deionized water, stirring evenly to obtain a mixed solution in a $N_2$ atmosphere, adjusting pH of the mixed solution to ≤3, adding CAN (cerium ammonium nitrate) into the mixed solution, stirring for at least 5 hours in the $N_2$ atmosphere, and dialyzing to obtain a DAC/PDMAEMA (poly-2-(dimethylamino) ethyl methacrylate) copolymer with a molecular weight of 5000-20000, wherein a mass ratio of the DAC, the DMAEMA, and the CAN is DAC: DMAEMA:CAN=1000:5.0-50.0:0.5-5.0;
   (3) mixing the DAC/PDMAEMA copolymer and PEI (Polyethylenimine) with a molecular weight of less than 10,000 at a mass ratio of 1:0.5-5.0, stirring at room temperature for graft copolymerization, and then dialyzing to obtain a suspension of a DAC/PDMAEMA/PEI copolymer with a molecular weight of 5000-20000; and
   (4) freezing the suspension of the DAC/PDMAEMA/PEI copolymer and then freeze-drying to obtain a product, wherein the product is a pH/temperature dual-sensitive cellulose-based aerogel, and a cumulative release amount of the dual-sensitive cellulose-based aerogel in 0.05 mol/L $NaH_2PO_4$ (pH=3-8), 0.2% NaCl (pH<3), or NaOH (pH>8) is 63-90%.

3. The method for preparing dual-sensitive cellulose-based aerogel according to claim 2, wherein the step (1) comprises preparing a DAC aqueous solution of the DAC, comprising: adding the DAC to deionized water, reacting at 70-150° C. for 0.5 hours to 4 hours at a stirring speed of 200-1000 rpm, centrifuging, and concentrating to obtain a transparent DAC aqueous solution.

4. The method for preparing dual-sensitive cellulose-based aerogel according to claim 2, wherein the cellulose comprises natural biomass cellulose or cellulose chemicals, the natural biomass cellulose comprises cellulose extracted from bamboo, wood, or cotton, and the cellulose chemicals comprise microcrystalline cellulose or nanocellulose.

5. The method for preparing dual-sensitive cellulose-based aerogel according to claim 2, wherein the $IO_4^-$ donor comprises periodic acid, sodium periodate, or potassium periodate.

6. The method for preparing dual-sensitive cellulose-based aerogel according to claim 2, wherein the step (3) comprises adding a reducing agent, and the reducing agent comprises at least one of lithium aluminum hydride, borohydride potassium, sodium borohydride, or sodium cyanoborohydride.

7. The method for preparing dual-sensitive cellulose-based aerogel according to claim 2, wherein the step (4) comprises stirring the product in a NaSA (Sodium Salicylate) solution for 22-26 hours to measure an adsorption capacity and comprises adding the product into a $NaH_2PO_4$ solution of 0.05 mol/L and pH=7.4 or a NaCl solution with a mass concentration of 0.2% and pH=2 to measure a maximum release amount of the cumulative release amount.

* * * * *